United States Patent
Brunken, Jr.

(10) Patent No.: US 8,662,843 B2
(45) Date of Patent: Mar. 4, 2014

(54) ADAPTIVE TWIST SYSTEM FOR A ROTOR BLADE

(75) Inventor: John E. Brunken, Jr., Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/703,766

(22) PCT Filed: Nov. 12, 2010

(86) PCT No.: PCT/US2010/056500
§ 371 (c)(1),
(2), (4) Date: Dec. 12, 2012

(87) PCT Pub. No.: WO2012/064337
PCT Pub. Date: May 18, 2012

(65) Prior Publication Data
US 2013/0089422 A1    Apr. 11, 2013

(51) Int. Cl.
*B64C 27/467* (2006.01)
(52) U.S. Cl.
USPC .................................................. 416/23
(58) Field of Classification Search
USPC ...................... 416/240, DIG. 5, 23
See application file for complete search history.

(56) References Cited

U.S. PATENT DOCUMENTS

| 5,320,491 A | 6/1994 | Coleman et al. |
| 6,382,556 B1 | 5/2002 | Pham |
| 8,246,303 B2 * | 8/2012 | Thomas et al. ................. 416/23 |
| 2002/0100842 A1 | 8/2002 | Perez |
| 2010/0258680 A1 | 10/2010 | Mercier Des Rochettes et al. |
| 2011/0116927 A1 * | 5/2011 | Hancock et al. ................. 416/23 |

OTHER PUBLICATIONS

International Search Report and Written Opinion from related PCT Application No. PCT/US2010/056500, mailed Jan. 12, 2011, 10 pages.
International Preliminary Report on Patentability from related PCT Application No. PCT/US2010/056500, mailed Feb. 28, 2013, 5 pages.

* cited by examiner

Primary Examiner — Richard Edgar
(74) Attorney, Agent, or Firm — James E. Walton

(57) ABSTRACT

The system of the present application includes an adaptive twist system for a rotor blade. The adaptive twist system includes a slider mechanism coupled to a spar and to a skin. The slider mechanism provides structural connectivity between the spar and the skin while also selectively translated the skin relative to the spar, thereby causing the rotor blade to twist. A control system is used to operate the slider mechanism so that the rotor blade is automatically twisted into the optional shape during changes in flight modes.

12 Claims, 4 Drawing Sheets

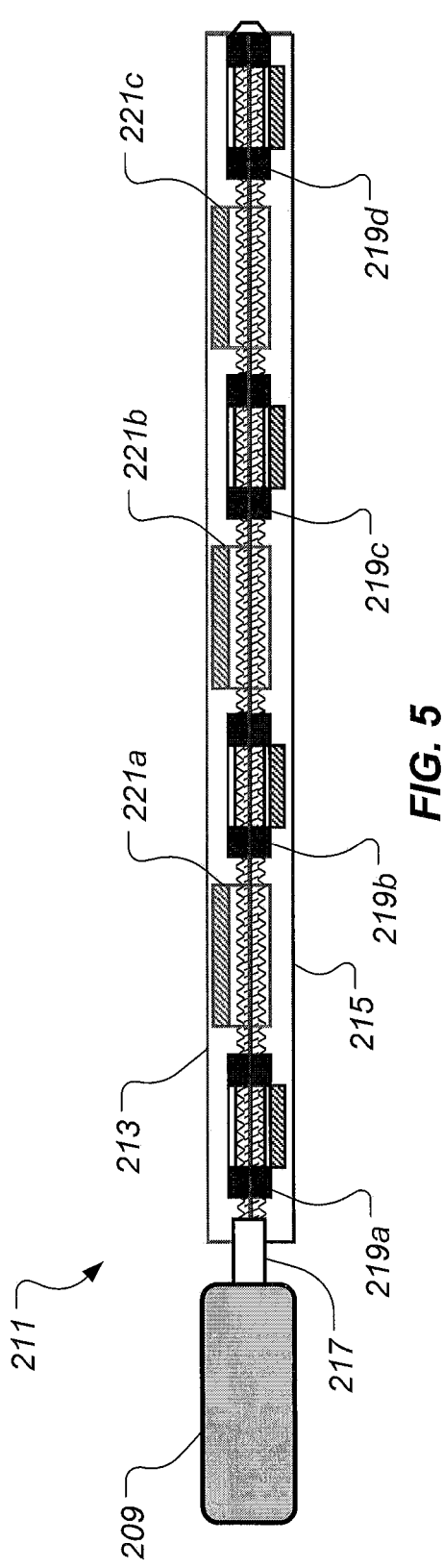
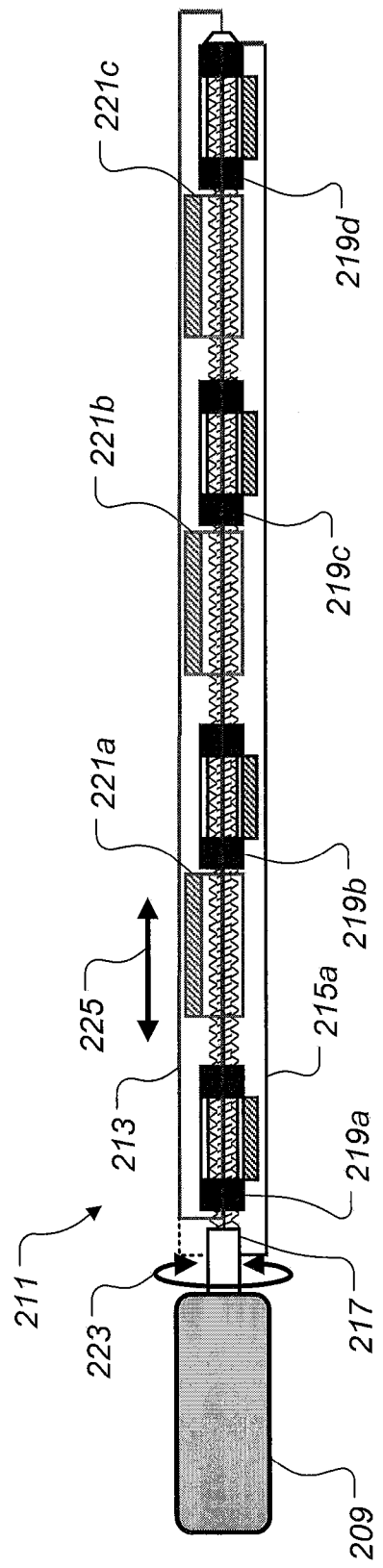

ADAPTIVE TWIST SYSTEM FOR A ROTOR BLADE

TECHNICAL FIELD

The present application relates to a rotor blade for an aircraft. In particular, the present application relates to a system for changing the airfoil shape of a rotor blade.

DESCRIPTION OF THE PRIOR ART

A typically rotor blade includes an airfoil shape which is optimized for a certain flight profile. For example, a conventional helicopter may have a rotor blade having airfoil shape that is optimized for hover performance, but as a result, sacrifices an airfoil shape that might otherwise be optimal for forward flight. As a result, attempts have been made in order to adaptively change an airfoil shape during flight so that the airfoil shape can be optimized for changes in flight patterns. One design includes the use of active tabs or flaps on the blade to selectively change the aerodynamic forces about the rotor blade. Another method includes changing the airfoil shape by mechanically twisting the rotor blade through application of a mechanical twisting moment against the torsional stiffness of the blade. In doing so, the rotor blade must be torsionally compliant, or soft, in order to achieve a significant amount of twist in the rotor blade. Torsional compliance in a rotor blade adversely affects rotor blade dynamics, stability, and loading.

Although the developments in rotor blade design have produced significant improvements, considerable shortcomings remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 5 is a stylized view of the adaptive twist system, according to the preferred embodiment of the present application;

FIG. 6 is a stylized view of the adaptive twist system, according to the preferred embodiment of the present application.

Figure 1:
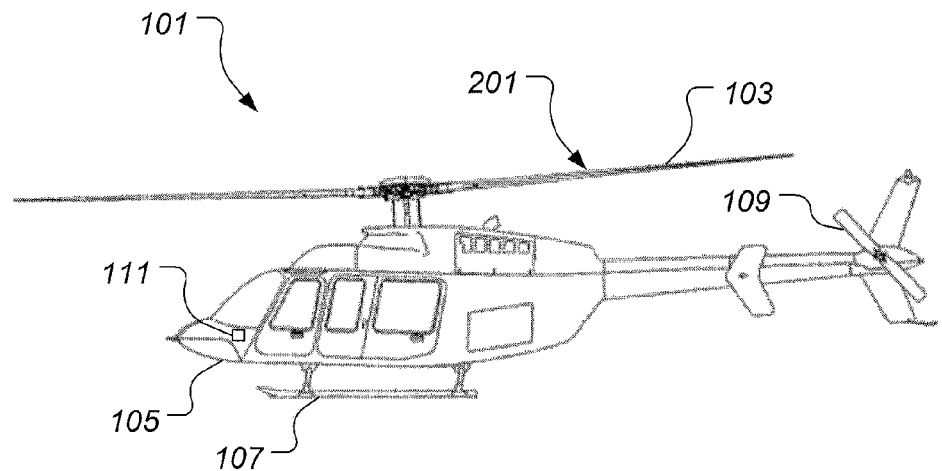
FIG. 1 is a side view of a rotorcraft with a rotor blade having an adaptive twist system according to the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIG. 1, a rotorcraft 101 is depicted having a plurality of rotor blades 103. Each rotor blade 103 includes an adaptive twist system 201, according to the preferred embodiment of the present application. Rotorcraft 101 includes a fuselage 105, a landing gear 107, and an anti-torque mechanism 109. Rotorcraft 101 includes an engine for providing torque to a rotor mast for turning each rotor blade 103 about a rotor mast axis of rotation. Furthermore, rotorcraft 101 includes a control system 111 for operating adaptive twist system 201, as discussed further herein. It should be appreciated that rotor blade 103, having adaptive twist system 201, may be implemented on a variety of aircraft. For example, a tiltrotor, a tilt wing, a gyrocopter, a conventional airplane, and the like, are examples of aircraft that may implement rotor blade 103 having adaptive twist system 201. Furthermore, any unmanned version of an aircraft may also include rotor blade 103 having adaptive twist system 201.

Figure 2:
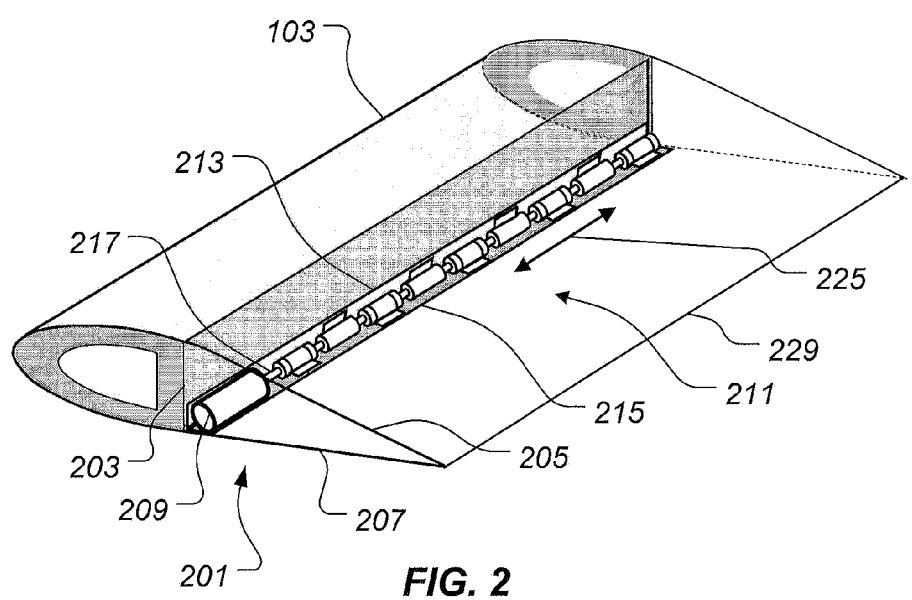
FIG. 2 is a partial stylized perspective view of the rotor blade having the adaptive twist system, according to the preferred embodiment of the present application.
Figure 3:
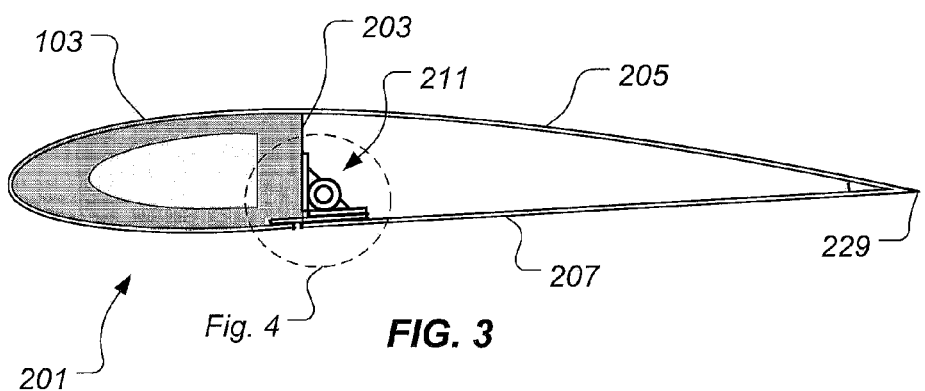
FIG. 3 is an end view of a selected portion of the rotor blade of FIG. 2.

Referring to FIGS. 2 and 3, adaptive twist system 201 includes a slider mechanism 211 driven by an actuator motor 209. Slider mechanism 211 is configured to selectively translate a lower skin 207 relative to a spar 203, thereby reconfiguring the airfoil shape of rotor blade 103 through a resulting twist. An alternative embodiment may include slider mechanism 211 configured to translate upper skin 205 relative to spar 203 instead of lower skin 207. Slider mechanism 211 is configured to provide structural continuity and high torsional stiffness in rotor blade 103 by continuously providing a structural load path between the structural components being translated. Furthermore, even as lower skin 207 is translated relative to a spar 203, slider mechanism 211 continuously provides a structural load path between lower skin 207 and spar 203.

Still referring to FIGS. 2 and 3, rotor blade 103 includes an upper skin 205 and lower skin 207, both of which form upper and lower surfaces of an airfoil shape. Preferably, upper skin 205 and lower skin 207 are structurally joined at a trailing edge 229. Spar 203 provides structural support to rotor blade 103 and is generally located along a spanwise direction of rotor blade 103. Spar 203 is a structural member that may be of a variety of shapes and sizes. For example, spar 203 may be "D" shaped so as to include a hollow portion. Further, spar 203 may simply be a beam extending in a spanwise direction. It should be appreciated that the airfoil shape of rotor blade 103 may have angle of incidence that varies over a spanwise length. For example, the airfoil shape of rotor blade 103 may have a high angle of incidence near the blade root, while a lower angle of incidence near the blade tip. Such an airfoil configuration compensates for the slower rotational speed near the blade root portion of rotor blade 103, as compared to the rotational speed near the blade tip.

Figure 4:
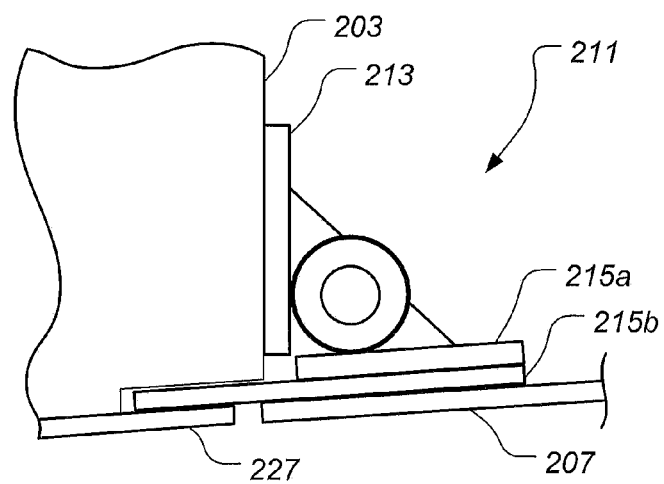
FIG. 4 is a stylized detail view of a portion of the adaptive twist system taken from FIG. 3.

Referring now also to FIG. 4, a partial end view of rotor blade 103 is illustrated. A spar adapter 213 is optionally located between slider mechanism 211 and spar 203. A lower skin adapter 215a and 215b are located between slider mechanism 211 and lower skin 207. However, a variety of structural adapters, and combinations thereof, may be used to couple slider mechanism 211 to spar 203 and lower skin 207. It should be appreciated that slider mechanism 211 may alternatively be coupled directly to spar 203 and lower skin 207, instead of employing adapters 215a, 215b, and 213. Lower skin adapter 215b preferably extends under a nose cap 227, such that lower skin adapter 215b and nose cap 227 to form a compressive seal, while also allowed sliding movement therebetween. Some embodiments may include a thin layer of a material having a low coefficient of friction to minimize frictional resistance and wear between lower skin adapter 215b and nose cap 227.

Referring now also to FIGS. 5 and 6, slider mechanism 211 is further illustrated. Slider mechanism 211 includes a plurality of fixed collars 219a-219d and threaded collars 221a-221c, each fixed collar and threaded collar being located in an alternating configuration. A screw drive shaft 217 is operable associated with actuator motor 209 such that motor 209 selectively applies torque to screw drive shaft 217. Actuator motor 209 may be any type of actuator motor, such as electric, hydraulic, pneumatic, piezoelectric, to name a few. A gearbox may be used to selectively tailor the rotational speed of screw drive shaft 217. Each fixed collar 219a-219d is fixed to screw drive shaft 217, as well as being coupled to lower skin 207 via lower skin adapters 215a and 215b. During operation, actuator motor 209 turns screw drive shaft 217 so that each collar 219a-219d also turns along with screw drive shaft 217. A bearing system located within each collar 219a-219d allows a portion of each collar 219a-219d to rotate with screw drive shaft 217, while another portion is fixedly coupled to lower skin 207 via adapters 215a and 215b. Each threaded collar 221a-221c is threadingly engaged with screw drive shaft 217, as well as being coupled to spar 203 via spar adapter 213. As such, constant structural connectivity is maintained between spar 203 and lower skin 207 through slider mechanism 211. More specifically, loads are transferred between spar 103 and lower skin 107 through the structural connection between each fixed collar 219a-219d and screw drive shaft 217, as well as between screw drive shaft 217 and each threaded collar 221a-221c. As such, it is preferred that each fixed collar 219a-219d and each threaded collar 221a-221c are located in an alternating configuration, thereby distributing the loading across each member.

It should be appreciated that mechanisms, other than slider mechanism 211, may be used to translate spar 203 in relation to lower skin 207 in order to induce a twist in rotor blade 103. For example, pneumatic pistons may be coupled to spar 203 and lower skin 207 in order to induce a twisting of rotor blade 103.

During operation, screw drive shaft 217 selectively turns in a direction 223, thereby causing lower skin 207 to move in a spanwise direction 225 while spar 203 remains stationary. The translation of lower skin 207 relative to spar 203 produces a twisting of rotor blade 103, causing a twisting change to the airfoil shape of rotor blade 103. A change to the airfoil shape may include a change to the cross-section airfoil shape itself, as well as a change to the angle of incidence along the spanwise length of rotor blade 103. Slider mechanism 211 is configured to maintain structural connectivity between spar 203 and lower skin 207. Because structural connectivity is maintained, high torsional stiffness is maintained in rotor blade 103.

Figure 7:
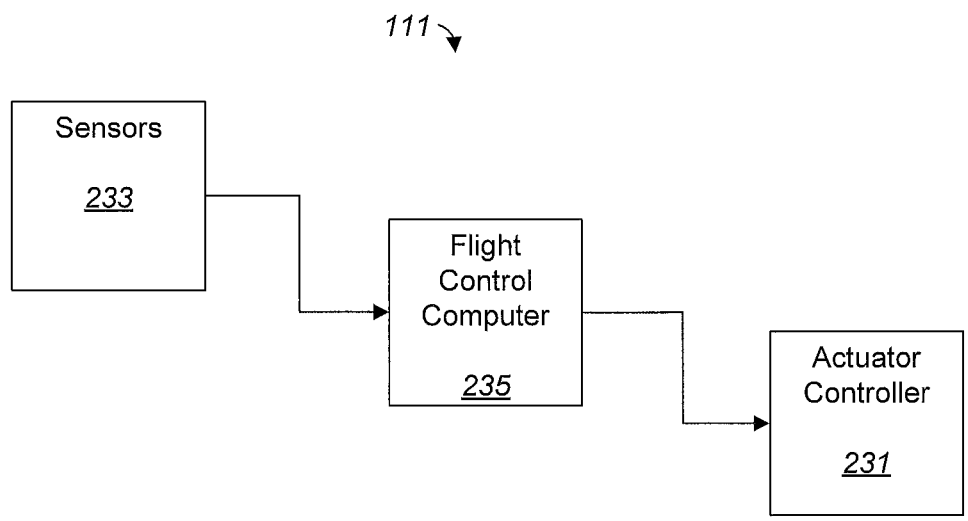
FIG. 7 is a schematic view of a control system for controlling the adaptive twist system, according to the preferred embodiment of the present application.

Referring to FIG. 7, control system 111 includes an actuator controller 231 for selectively controlling the operation of adaptive twist system 201. More specifically, actuator controller 231 selectively controls the rotation of screw drive shaft 217 via actuator motor 209. Actuator controller 231 sends commands to actuator motor 209. Exemplary commands include a rotational direction command and a speed of rotation command. Actuator controller 231 receives inputs from a flight control computer 235. Flight control computer 235 interprets data from sensors 233 in order to selectively configure the airfoil shape of rotor blade 103 in the most desirable airfoil shape, via adaptive twist system 201. For example, sensors 233 may include an outside air temperature (OAT) sensor, a forward airspeed sensor, gross weight sensor, and altitude sensor, to name a few. During operation of rotorcraft 101, flight control computer 235 can determine that rotorcraft 101 has slowed into a hover flight pattern, thus sending a signal to actuator controller 231 that reconfigures the airfoil shape of rotor blade 103 by twisting rotor blade 103 with adaptive twist system 201. In an alternative embodiment, adaptive twist system 201 is controlled by an operator of rotorcraft 101, such as a pilot. Furthermore, it is preferred that adaptive twist system 201 makes changes to the airfoil shape of rotor blade 103 when the rotorcraft 101 changes between flight modes, such as between a hover mode and a forward flight mode. However, it is also contemplated that adaptive twist system 201 may be used to change the airfoil shape of rotor blade 103 one or more times within a single revolution about the mast axis of rotation.

The system of the present application provides significant advantages, including: (1) providing a system for changing the airfoil shape of a rotor blade during operation; (2) providing a system that enables the rotor blade to maintain a high degree of torsional stiffness; and (3) providing a system that maintains structural connectivity between translating parts in the rotor blade.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. An adaptive twist system for a rotor blade, the adaptive twist system comprising:
 a slider mechanism coupled to a spar and to a skin, the slider mechanism configured to provide structural connectivity between the spar and the skin;
 a skin adapter located between the slider mechanism and the skin, the skin adapter extending under a nose cap to form a compressive seal and sliding movement therebetween, the nose cap adjacent the spar;
 an actuator configured to drive the slider mechanism;
 wherein the slider mechanism is configured to translate the skin relative to the spar in a spanwise direction, thereby causing the rotor blade to twist;
 wherein the slider mechanism comprises:
  a screw drive shaft located in spanwise direction along the rotor blade;
  a fixed collar coupled to the skin, the fixed collar including a bearing to allow a first portion of the fixed collar to rotate along with the screw drive, while a second portion of the fixed collar remains fixed relative to the skin;
  a threaded collar coupled to the spar, the threaded collar including receiving threads such that rotation of the screw drive shaft causes the threaded collar to translate relative to the fixed collar.

2. The adaptive twist system according to claim 1, wherein the skin is a lower skin.

3. The adaptive twist system according to claim 1, further comprising:
 a spar adapter located between the threaded collar and the spar.

4. The adaptive twist system according to claim 1, wherein the skin adapter is further located between the fixed collar and the skin.

5. The adaptive twist system according to claim 1, further comprising:
 a low-friction layer between the skin adapter and the nose cap, the low-friction layer being configured to prevent wear during translation of the skin adapter relative to the nose cap.

6. A rotorcraft comprising:
 a plurality of rotor blades, each rotor blade having an adaptive twist system, the adaptive twist system comprising:
  a slider mechanism configured to slide a skin relative to a spar, thereby causing the rotor blade to twist; and
  a skin adapter located between the slider mechanism and the skin, the skin adapter extending under a nose cap to form a compressive seal and sliding movement therebetween, the nose cap adjacent the spar;
 a control system configured to automatically control the adaptive twist system so that a shape of each rotor blade is twisted into an optimal shape during operation of the rotorcraft;
 wherein the slider mechanism is configured to translate the skin relative to the spar in a spanwise direction, thereby causing the rotor blade to twist, the slider mechanism configured to provide structural connectivity between the spar and the skin;
 wherein the slider mechanism comprises:
  a screw drive shaft located in spanwise direction along the rotor blade;
  a fixed collar coupled to the skin, the fixed collar including a bearing to allow a first portion of the fixed collar to rotate along with the screw drive, while a second portion of the fixed collar remains fixed relative to the skin;
  a threaded collar coupled to the spar, the threaded collar including receiving threads such that rotation of the screw drive shaft causes the threaded collar to translate relative to the fixed collar.

7. The rotorcraft according to claim 6, wherein the control system automatically operates the adaptive twist system to twist the rotor blade when the rotorcraft converts from a hover flight mode to a forward flight mode.

8. The rotorcraft according to claim 6, wherein the control system automatically operates the adaptive twist system to twist the rotor blade when the rotorcraft converts from a forward flight mode to a hover flight mode.

9. The rotorcraft according to claim 6, further comprising:
 a spar adapter located between the threaded collar and the spar.

10. The rotorcraft according to claim 6, wherein the skin adapter is further located between the fixed collar and the skin.

11. The rotorcraft according to claim 6, further comprising:
 a low-friction layer between the skin adapter and the nose cap, the low-friction layer being configured to prevent wear during translation of the skin adapter relative to the nose cap.

12. The rotorcraft according to claim 6, wherein the skin is a lower skin.

* * * * *